(12) United States Patent
Arora

(10) Patent No.: US 6,364,316 B1
(45) Date of Patent: Apr. 2, 2002

(54) DUAL PRESSURE BALANCED NONCONTACTING FINGER SEAL

(75) Inventor: Gulshan K. Arora, San Diego, CA (US)

(73) Assignee: Honeywell International Inc., Morris Township, NJ (US)

(*) Notice: Subject to any disclaimer, the term of this patent is extended or adjusted under 35 U.S.C. 154(b) by 0 days.

(21) Appl. No.: 09/658,074

(22) Filed: Sep. 11, 2000

Related U.S. Application Data

(63) Continuation-in-part of application No. 09/248,441, filed on Feb. 11, 1999, now Pat. No. 6,196,550.

(51) Int. Cl.[7] .................................................. F16J 15/44
(52) U.S. Cl. ........................ 277/355; 277/417; 277/552; 277/559; 277/926
(58) Field of Search ............................. 277/355, 417, 277/418, 926, 552, 559; 415/173.5, 174.5

(56) References Cited

U.S. PATENT DOCUMENTS

| | | | |
|---|---|---|---|
| 2,124,108 A | * | 7/1938 | Greece |
| 2,233,579 A | | 3/1941 | Bowers |
| 3,460,842 A | | 8/1969 | Pointer et al. |
| 3,744,805 A | | 7/1973 | Heinrich |
| RE30,206 E | | 2/1980 | Ferguson et al. |
| 4,202,554 A | | 5/1980 | Snell |
| 4,358,120 A | | 11/1982 | Moore |
| 4,415,317 A | | 11/1983 | Butterworth |
| 4,600,202 A | | 7/1986 | Schaeffler et al. |
| 4,645,217 A | * | 2/1987 | Honeycutt, Jr. et al. |
| 4,678,113 A | | 7/1987 | Bridges et al. |
| 4,696,480 A | | 9/1987 | Jornhagen |
| 4,770,424 A | | 9/1988 | Otto |
| 4,781,530 A | | 11/1988 | Lauterbach et al. |
| 4,940,080 A | | 7/1990 | Reeves et al. |
| 5,031,922 A | | 7/1991 | Heydrich |
| 5,042,823 A | | 8/1991 | Mackay et al. |
| 5,071,138 A | * | 12/1991 | Mackay et al. |
| 5,106,104 A | * | 4/1992 | Atkinson et al. ........... 277/355 |
| 5,108,116 A | | 4/1992 | Johnson et al. |
| 5,755,445 A | | 5/1998 | Arora |
| 5,799,952 A | * | 9/1998 | Morrison et al. ........... 277/355 |
| 5,941,685 A | * | 8/1999 | Bagepalli et al. |

FOREIGN PATENT DOCUMENTS

| | | |
|---|---|---|
| DE | 626541 | 2/1936 |
| GB | 2021209 A | 11/1979 |

* cited by examiner

Primary Examiner—Chuck Y. Mah
Assistant Examiner—Alison K. Pickard
(74) Attorney, Agent, or Firm—Robert Desmond, Esq.

(57) ABSTRACT

An annular sealing apparatus is disclosed for disposition in cooperation with a body defining a bore and a rotating member rotatably received in the bore, the bore and rotating member bounding a high fluid pressure region and a relatively lower pressure fluid region therebetween, the sealing apparatus inhibiting fluid leakage between the high and lower fluid pressure regions, the sealing apparatus has a fore cover plate disposed in the high fluid pressure region and aft cover plate disposed in the lower pressure fluid region. A sealing element comprised of a plurality of comb-like diaphragm members is disposed between the two cover plates. Each of the diaphragm members has a foot portion with a groove. At low rotational speeds the foot portion abuts against the rotating member. Because of the groove, as the speed increases, the pressure and hydrodynamic forces on the inner surface of the foot portion causes it to lift away from the rotating member and ride on a thin film of air thus effectively sealing the rotating member.

13 Claims, 7 Drawing Sheets

DUAL PRESSURE BALANCED NONCONTACTING FINGER SEAL

CROSS-REFERENCE TO COPENDING APPLICATION

This application is a continuation-in-part of U.S. patent application Ser. No. 09/248,441 filed Feb. 11, 1999, now U.S. Pat. No. 6,196,550 granted Mar. 6, 2001.

The United States Government has rights in the present invention pursuant to Contract No. N00421-96-C-1096 issued by the United States Navy.

TECHNICAL FIELD

This invention relates generally to sealing devices disposed in association with two relatively rotatable members and providing a fluid seal therebetween. More particularly, the present invention relates to an apparatus for achieving sealing between a rotating member and a housing circumscribing the rotating member.

BACKGROUND OF THE INVENTION

Gas turbine engines employ sealing devices in various capacities where it is necessary to restrict the flow of fluid or gases from one portion of the engine to another. A common use is for separating the primary engine flow path from the secondary flow path. The primary engine flow path directs the flow of gases to the compressor and turbine stages from which the engine derives thrust or power. The secondary flow path comprises a series of conduits for delivering compressed air throughout the engine for performing a variety of functions. Compressed air is used, for example, to cool individual components, provide a bleed air source, buffer the lubricated bearing cavities, control the ventilation among engine cavities and structures, and affect the thrust balance of the engine. Loss of compressed air from the secondary flow path through leakage can have a substantial adverse effect on the performance of these functions. In a turbine engine, at least one sealing device typically is required for each turbine and compressor stage of the engine.

Another common use for sealing devices in turbine engines is for separating the secondary flow path from engine cavities containing fluids such as lubricating oil. In pressurized aircraft, bleed air taken from the secondary flow path supplies the aircraft environmental control system. Even small amounts of oil in the bleed air can render it unsuitable for this purpose. Further, oil leakage can lead to coking of the seal, and ultimately reduced seal life. To prevent this, buffered sealing devices typically are incorporated adjacent lubricated bearings and engine oil sumps.

The most common type of seal used for these purposes is the labyrinth seal. A labyrinth seal is comprised of a multiplicity of radially extending annular knives mounted on a rotating shaft, and an annular seal land closely circumscribing the knife edges. The gap between the knife edges and the lands restricts the flow of secondary flow path air therethrough, creating a seal.

A problem inherent with labyrinth seals is that these gaps must be large enough to accommodate radial excursions of the shafting on which the seal is mounted. Radial excursions can be substantial, particularly in propulsion gas turbine engines. Large radial excursions may be caused by critical speed response, aircraft maneuver induced loading, impact loads, engine vibration, and thermal and speed transients. To minimize leakage, a relatively thick layer of material is added to the seal land, into which the seal knives cut grooves during these radial excursions. The added layer of material typically consists of either a coating of silver or ceramic abradable material, or a welded on honeycomb type material.

Labyrinth seals are also very costly to manufacture. The rotating portions are machined from expensive high-strength forging to a complex shape having exacting dimensional requirements. Additionally, in many of these seals a costly manufacturing technique is required for welding on the leakage reducing honeycomb material to the seal land. Nevertheless, gaps remain fairly large in operation and the leakage rates higher than desired for many applications.

An improved sealing concept less commonly seen in turbine engines is the brush seal. Brush seals may take a variety of forms for use in a variety of types of applications. When configured for use in a turbine engine, brush seals are typically comprised of a plurality of generally radially oriented metal wires tightly packed and bound at their outer ends into an annular retainer. This brush structure, which comprises the nonrotating part of the seal, is mounted to a wall or plenum structure which houses a rotating shaft. The radially innermost tips of the wires making up the brush form a bore for receiving the rotating shaft in a slightly radially interfering relationship. Because of the flexibility of this brush portion, the seal can accommodate radial excursions of the shafting without the need for a radial gap between the seal and shaft. Thus, leakage is confined predominately to migration of fluid through the brush portion itself, and is controlled by ensuring that the wires are densely packed. Brush seals are typically selected based on their sealing capability, providing improved sealing over even multi-stage labyrinth seals.

Brush seals, however, suffer from a high rate of wear and must be replaced often. The ends of the metal wires begin wearing immediately upon use, causing leakage between the brush and the shaft to increase over time. In turbine engine applications wear induced leakage may ultimately reach an unacceptable level, necessitating replacement of the seal. The continuous rubbing contact also tends to abrade the surface of the shaft, or rotating component in contact with the brush, potentially resulting in expensive replacement or rework of the rotating parts as well. Yet another problem associated with brush seals is that they have a tendency to occasionally lose bristles. This tendency may preclude the use of a brush seal in applications where the resulting risk of damage to neighboring components is high.

On the other hand, as the demand for small size, increased power output, and improved specific fuel consumption increases in the turbine engine arts, the brush seal becomes increasingly attractive. Such is the case because of the brush seal's improved sealing effectiveness, smaller size, and it is hoped, decreased engine cost when compared to engine designs using conventional labyrinth seals.

Among the sealing devices more recently developed is the finger seal. Finger seals are comprised generally of a plurality of flexible members fixed at one end, the opposite ends sealingly engaging a surface that is rotatable relative thereto. The fingers of a finger seal are an integral part of the seal, usually formed by machining a series of curved slots in a forged ring or a length of sheet stock, the slots being of consistent length and extending from a common edge of the material. A complete seal is usually made up of two or more layers of fingers relatively positioned such that the gaps between fingers in one layer are blocked by the fingers of the next layer.

During engine operation, the fingers deform in a generally radially outward direction due to various factors including centrifugal growth of the rotating surface. In order to maintain an effective seal, it is also necessary for the fingers to restore themselves radially inward as the rotating surface shrinks. Fluid pressure acting on the radially deformed fingers, however, causes the fingers to deform axially often resulting in forceful contact between the fingers and adjacent structures. This axial deformation creates a frictional force that hampers radially inward recovery of the fingers as rotational velocity of the rotatable surface subsides. Consequently, the fingers are unable to re-engage the movable surface as it shrinks. Accordingly, the desired seal therebetween is undermined leading to engine inefficiencies.

A solution to this problem can be found in copending U.S. patent application Ser. No. 091248,441 filed Feb. 11, 1999 and assigned to the assignee of this patent application. The '441 application discloses a sealing apparatus having a plurality passages between the high pressure side of the seal and a cavity on the low pressure side but isolated from the low pressure air. The pressure in the cavity is at an intermediate pressure slightly less than the high pressure. As a consequence the total pressure drop across the seal is reduced reducing the axial deformation.

Though the '441 application solved the problem of axial deformations, some fingers seals such as the ones disclosed in Arora, U.S. Pat. No. 5,755,445 have non-contacting foot portions that are designed to lift off from the shaft as speed of the shaft increases. Testing of these seals revealed that the foot portions were not able to lift off. This was attributed to the hydrodynamic force acting to lift the foot portions away from the shaft not being high enough to overcome the pressure induced force in the radial direction across the foot portions.

Accordingly, a need exists for a foot portion in a finger seal configured to overcome the deficiencies of the prior art foot portions.

SUMMARY OF THE INVENTION

An object of the present invention is to provide a finger seal with a foot portion configured to overcome the deficiencies of the prior art foot portions.

The present invention meets this objective by providing a sealing apparatus having fore and aft annular cover plates. Disposed between these plates are a fore spacer, a sealing element, and an aft spacer. The sealing element comprises two comb-like diaphragm members extending radially inward from a continuous, circumferential band portion. Each diaphragm member has a plurality of uniformly spaced integral finger members, the foot portions of which sealingly contact the rotating member. The finger members of each diaphragm member have gaps therebetween. The diaphragm members are positioned so that the finger members of one blocks the finger member gaps of the other and vice versa. The band portions have a plurality of circumferentially disposed holes which define an axial passage when the diaphragm members are assembled. The fore spacer has a plurality of radial passages which deliver high pressure fluid to the axial passage in the diaphragm members. From the axial passages the high pressure fluid flows through radial passages in the aft spacer to cavities in the aft spacer. Thus, the net axial force or thrust exerted on the sealing element is greatly reduced when compared to the prior art configurations that do not have these pressure balancing passages. With this reduced axial force, the frictional force between aft spacer and the sealing element is reduced which eliminates or greatly reduces binding of sealing element against the aft spacer. The sealing element is now free to expand and contract radially as required. Further, each of the foot portions has a balancing groove so that at higher rotational speeds of the rotating member the pressure and hydrodynamic forces on the inner surface of the foot portion causes it to lift away from the rotating member and ride on a thin film of air thus effectively sealing the rotating member.

DESCRIPTION OF THE PREFERRED EMBODIMENT

Figure 1:
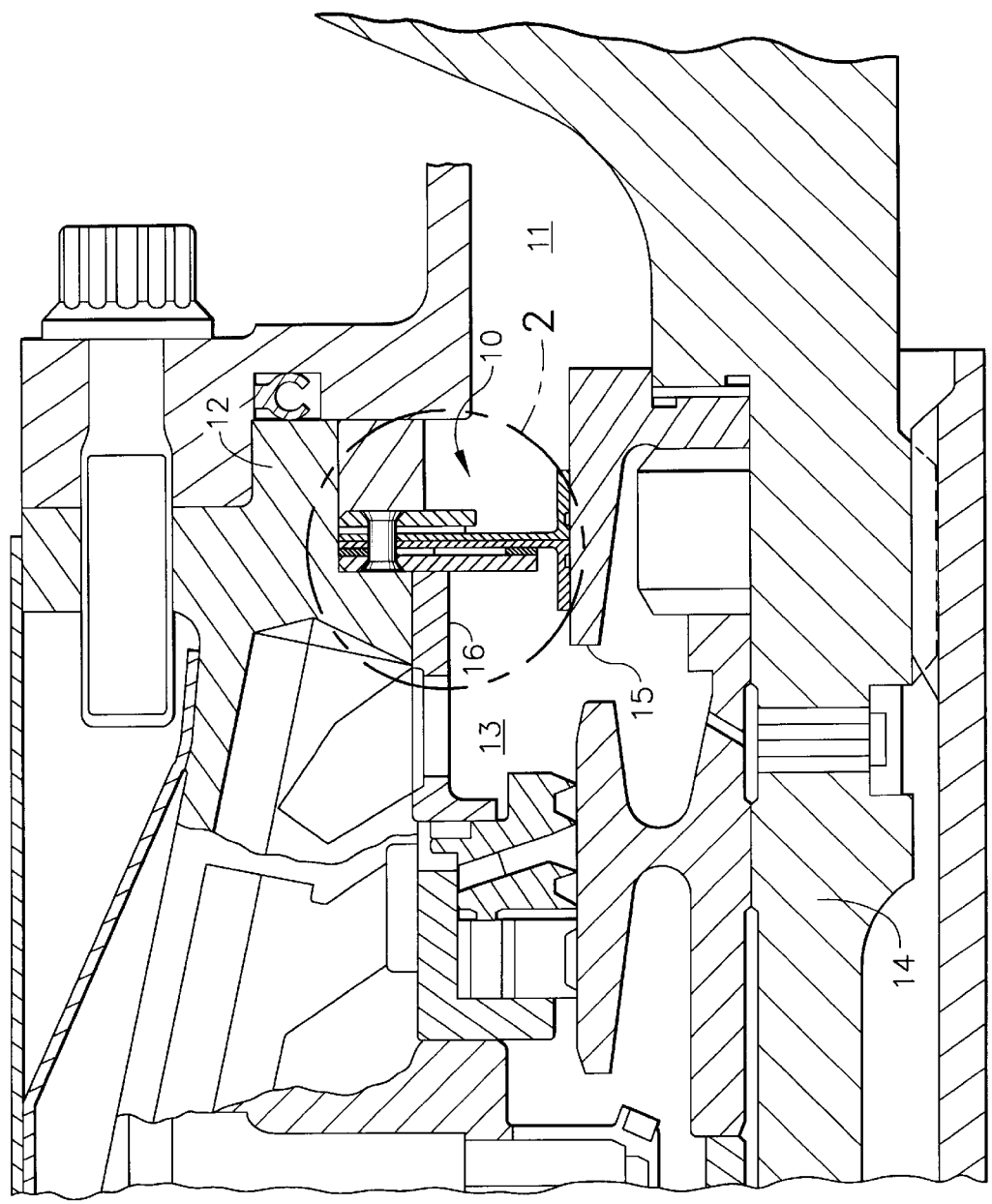
FIG. 1 depicts an upper half axi-symmetric cross-sectional view of a sealing apparatus embodying a seal incorporating features of the invention within a portion of a gas turbine engine.

The drawing figures are intended to illustrate the general manner of construction and are not to scale. In the description and in the claims the terms left, right, front and back and the like are used for descriptive purposes. However, it is understood that the embodiment of the invention described herein is capable of operation in other orientations than is shown and the terms so used are only for the purpose of describing relative positions and are interchangeable under appropriate circumstances.

FIG. 1 shows a sealing apparatus generally referenced with the numeral 10 mounted in a portion of a gas turbine engine. The sealing apparatus 10 is disposed between a body 12 and a rotating member of the engine such as a seal rotor 15 mounted to a shaft 14 to provide sealing therebetween and to prevent fluid communication between a cavity 11 at a higher fluid pressure than that of cavity 13. The body 12 defines a bore 16 through which passes the rotatable shaft 14 and seal rotor 15. The sealing apparatus 10 is carried by the body 12 at bore 16 and encircles and contacts the seal rotor 15 to provide a rotatable seal as described more fully hereinafter.

Figure 2:
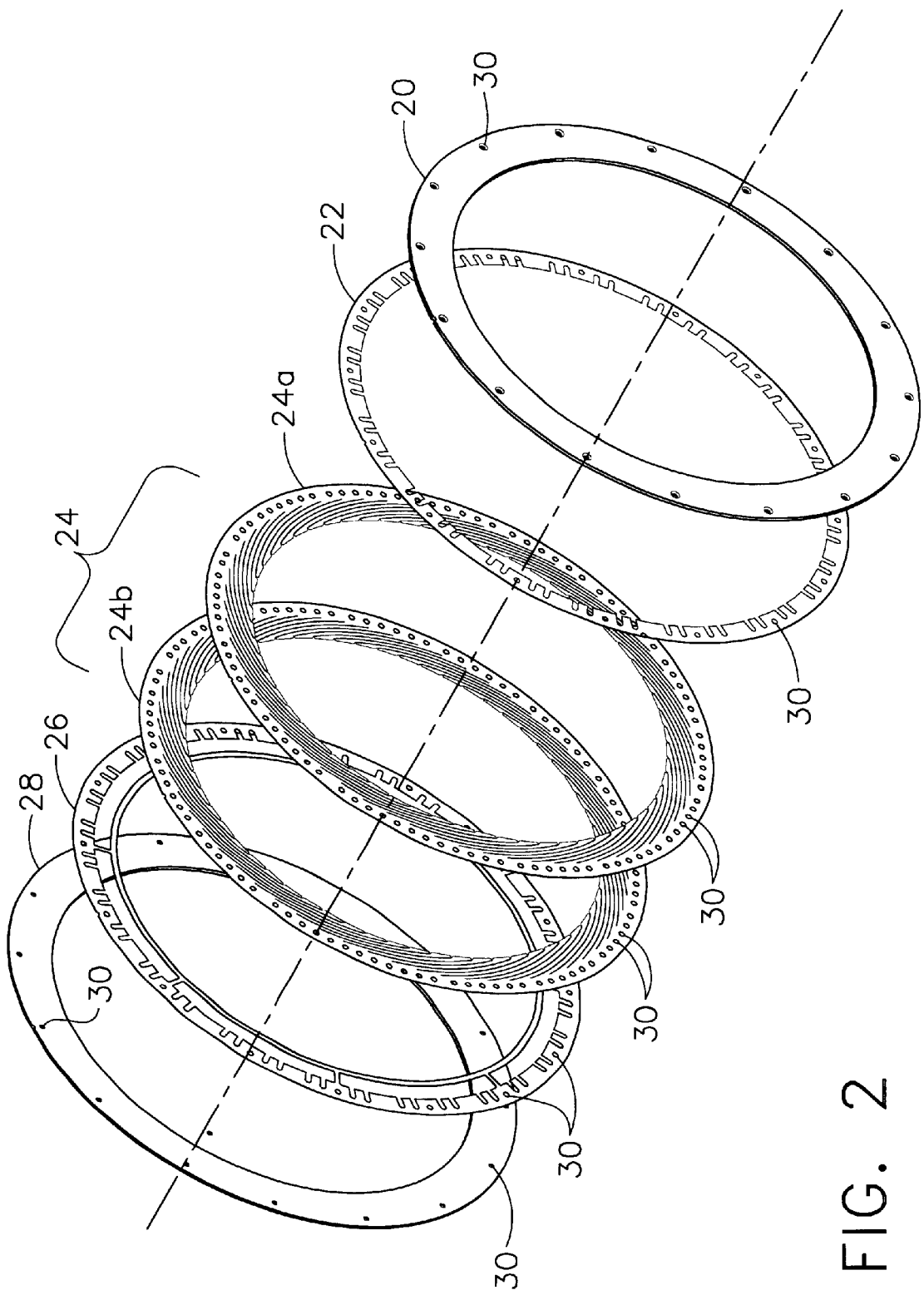
FIG. 2 is an exploded view of the sealing apparatus contemplated by the present invention.
Figure 4:
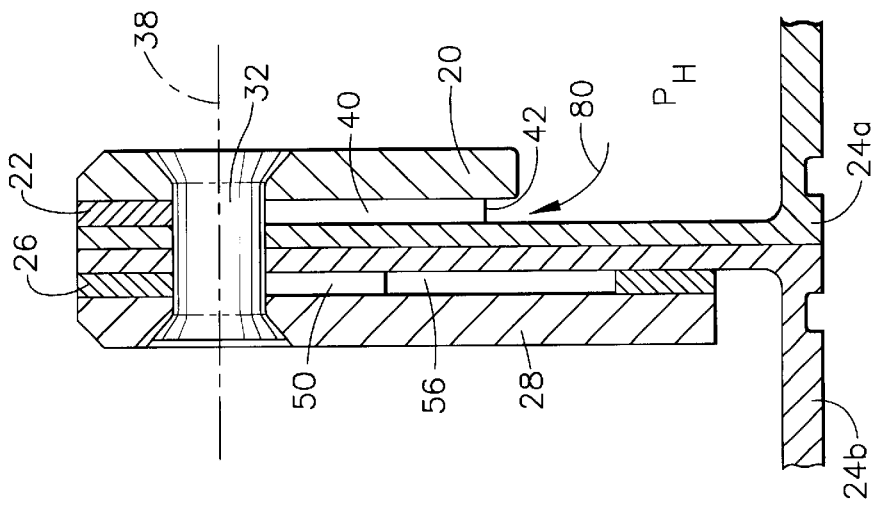
FIG. 4 is a cross sectional view of the sealing apparatus contemplated by the present invention showing the rivet.

Referring to FIG. 2, the sealing apparatus 10 includes an annular housing comprised of a fore cover plate 20 and an aft cover plate 28. The plates 20 and 28 are carried by body 12 and extend radially inward toward but short of seal rotor 15 or other rotating component. The fore cover plate 20 is disposed on the high pressure side of sealing apparatus 10 while the aft cover plate 28 is on the low pressure side. Disposed between the plates 20 and 28 is a sealing element 24 which in the preferred embodiment is comprised of two thin annular metallic diaphragm members 24a and 24b. A fore spacer 22 is disposed between the cover plate 20 and the diaphragm member 24a and an aft spacer 26 is disposed between the aft cover plate 28 and the diaphragm member 24b. At a radially outer margin of each of the plates, spacers and diaphragm members are a plurality of circumferentially spaced rivet holes 30. Rivets 32, see FIG. 4, are mounted through these holes 30 to hold the plates, spacers and diaphragm members together. Note that the diaphragm members 24 have two rivet holes 30 the reason for which will be explained later in the specification.

Figure 5:
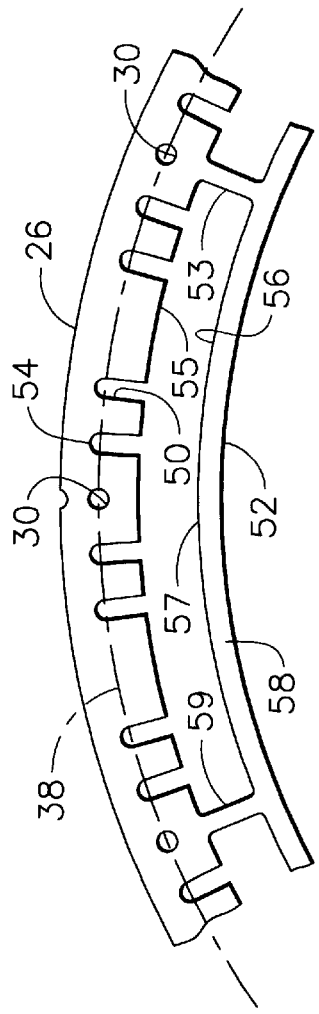
FIG. 5 is an enlarged fragmentary view of the aft spacer.
Figure 6:
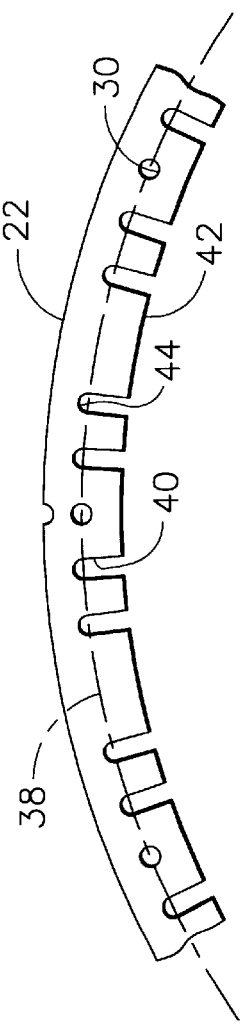
FIG. 6 is an enlarged fragmentary view of the fore spacer.

Referring to FIGS. 5 and 6, the fore spacer 22 is annular and has a plurality of radial passages 40 extending radially outward from the spacer's inner edges 42. These passages 40 are circumferentially disposed and extend only part way into the spacer. Importantly, for reasons explained later, the diameter of the radial outer ends 44 of the passages 40 must be greater than an alignment diameter defined by a curved line 38. The aft spacer 26 also has a plurality of circumferentially disposed radial passages is 50 that have radial outer ends 54 with diameters greater than the alignment diameter 38. The radial passages 50 extend inward until they reach a cavity 56. The cavity 56 is defined by a radial outer edge 55, a radial inner edge 57, and radially extending walls 53 and 59. In the preferred embodiment there are eight cavities 56 circumferentially disposed in the aft spacer 26. Each of these cavities 56 fluidly communicates with eight of the radial passages 50. It should be appreciated, however, that the number of cavities and radial passages may vary in different embodiments of the present invention. The annular portion of the aft spacer 56 between the inner edge 57 of the cavities and the inner edge 52 of the aft spacer is referred to as a sealing dam 58.

Figure 7:
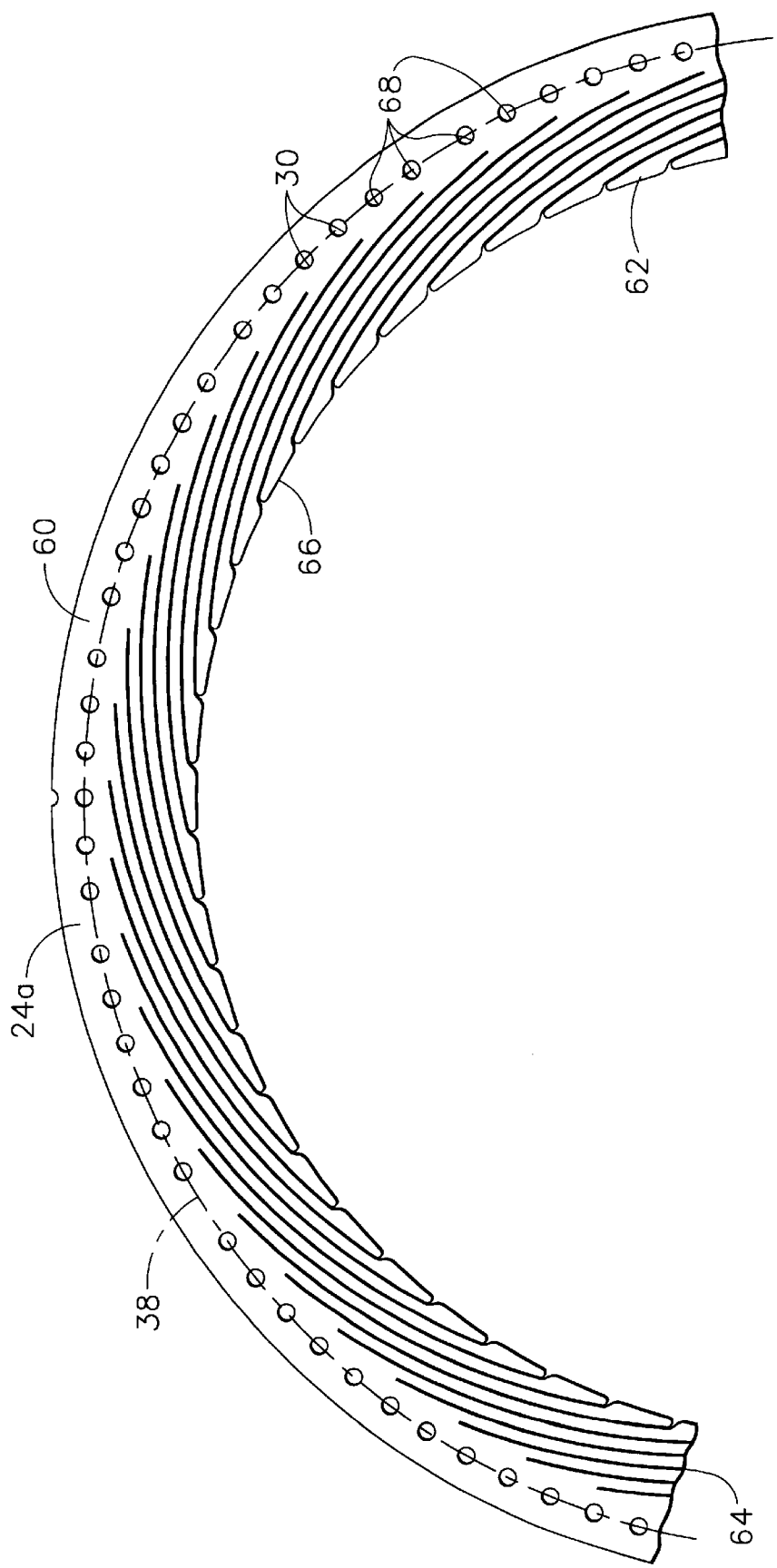
FIG. 7 is an enlarged fragmentary view of a diaphragm member.

With the exception of the foot portions 66, the diaphragm members 24a and 24b are like those described in Johnson et al., U.S. Pat. No. 5,108,116 which is incorporated herein by reference. The following description of diaphragm member 24a applies equally to the other diaphragm member 24b. Referring to FIG. 7, the diaphragm member 24a is annular and has a circumferentially continuous band portion 60. Rivet holes 30 go through this band portion 60 at the alignment diameter 38. Extending radially inward from this band portion 60 are a plurality of circumferentially uniformly arrayed finger portions 62 each having about the same thickness and ending at a foot portion 66. The finger portions 62 are circumferentially spaced apart to define a plurality of uniform gaps 64 therebetween that are narrower than the finger portions 62. The combination of the band portion 60, the finger portions 62, and the gaps 64 give the diaphragm member 24a a comb-like configuration. The ends of the finger members 62 cooperatively define an inner diameter which is slightly less than the outer diameter of rotor 15. Consequently, when the diaphragm member 24a is received about the rotating rotor 15 a running interference is created between the bottom surfaces of the foot portions 66 and the outer surface of the rotor 15. This interference causes each of the finger members 62 to slightly deflect which in turn cause the bottom surfaces of the foot portions 66 to lightly press against the outer surface of rotor 15.

Preferably, the outer surface of rotor 15 is hard coated to reduce wear. To prevent leakage through the gaps 64, each diaphragm member is clocked or rotated relative to the other diaphragm member. For example, the gaps 64 in diaphragm member 24a are blocked by the finger members 62 of diaphragm member 24b. Thus the need for two rivet holes 30 becomes apparent. The two rivet holes allow the diaphragm members to be clocked relative to each other. It also allows them to be interchangeable which reduces manufacturing costs. In addition to the rivet holes 30, there are also a plurality of circumferentially disposed leakage holes 68 through the band portion 60. These holes 68 are located at the aligning diameter 38.

Figure 3:
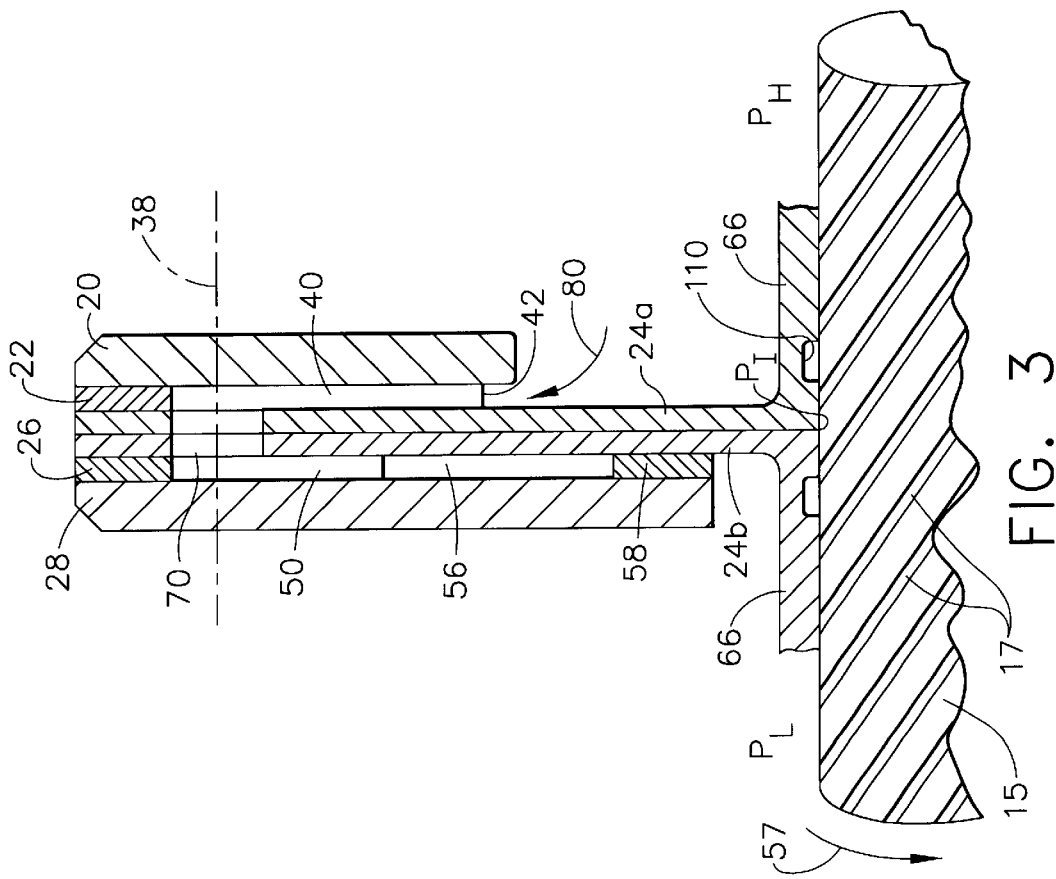
FIG. 3 is a cross sectional view of the sealing apparatus contemplated by the present invention showing the axial flow passage.

Referring to FIGS. 3 and 4, when assembled and properly aligned along the alignment diameter, the leakage holes 68 of each of the diaphragm members along with the upper portions of passages 40 and passages 50 define a plurality of axial passages 70. In operation, high pressure air (PH) represented by arrow 80 flows radially outward between the fore cover plate 20 and the diaphragm member 24a, through the radial passages 40, axial passages 70, radial passages 50 and then into the cavities 56 at an intermediate pressure. The sealing dam 58 seals the cavities 56 from the low pressure side (PL) of the sealing apparatus. The pressure drop or change in pressure from PH to the cavities is very slight, generating very little thrust in the axial direction. Thus, the net axial force or thrust exerted on sealing element is greatly reduced when compared to the prior art configurations that do not have these pressure balancing passages. With this reduced axial force, the frictional force between aft spacer 26 and the sealing element 24 is reduced which eliminates or greatly reduces binding of sealing element 24 against aft spacer 26. Sealing element 24 is now free to expand and contract radially as required to maintain sealing engagement with rotor 15 during any given engine operating condition.

Figure 8:
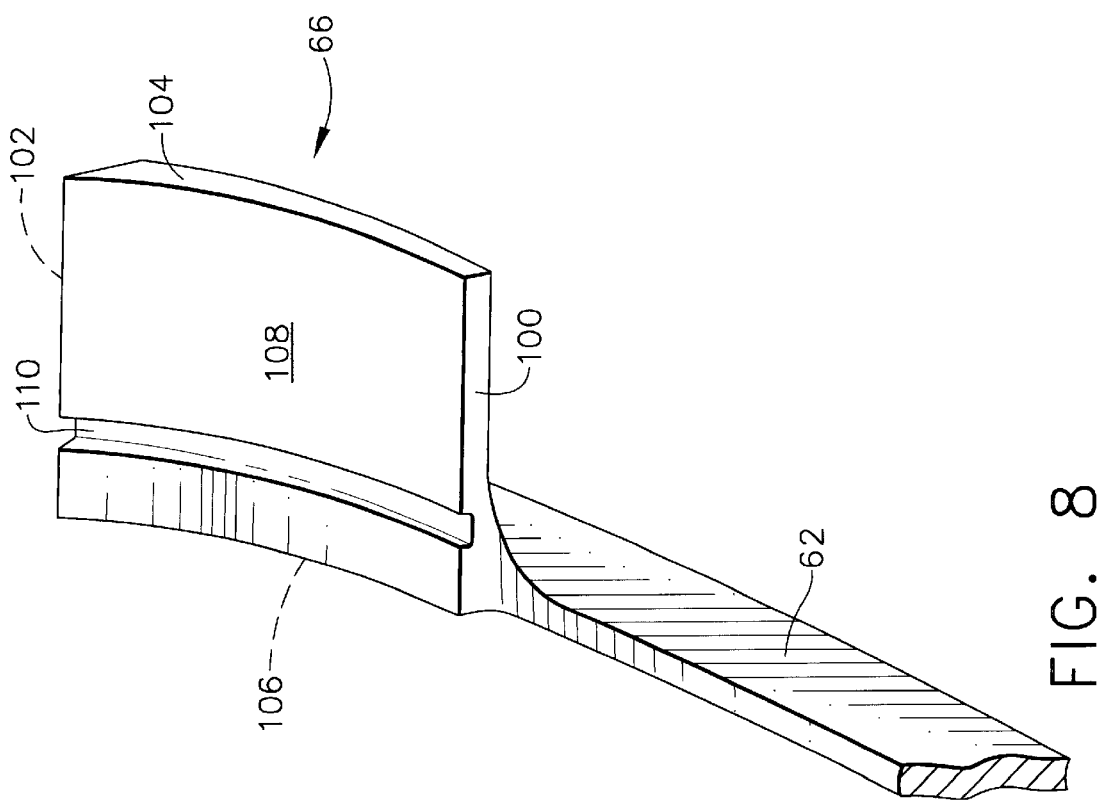
FIG. 8 is a perspective view of a foot portion of the sealing apparatus contemplated by the present invention.

Referring to FIG. 8, the foot portion 66 is bounded by a leading edge 100, a trailing edge 102, and axial facing edges 104, 106 and has a generally rectangular shape. The inner surface 108 of the foot portion 66 has the same curvature as the shaft which is being sealed. Extending from the leading edge 100 to the trailing edge 102 is a groove 110. The groove 110 is located closer to the axial edge 106 which is where the foot portion 66 connects to the finger member 62.

In the preferred embodiment, the flat length from leading edge to trailing edge is about 0.3 inches, the width is about 0.275 inches and the thickness of the foot portion 66 is about 0.03 inches. The groove 110 has a depth of about 0.015 inches, a width of about 0.03 inches and is located about 0.03 inches from the axial edge 106.

Figure 9:
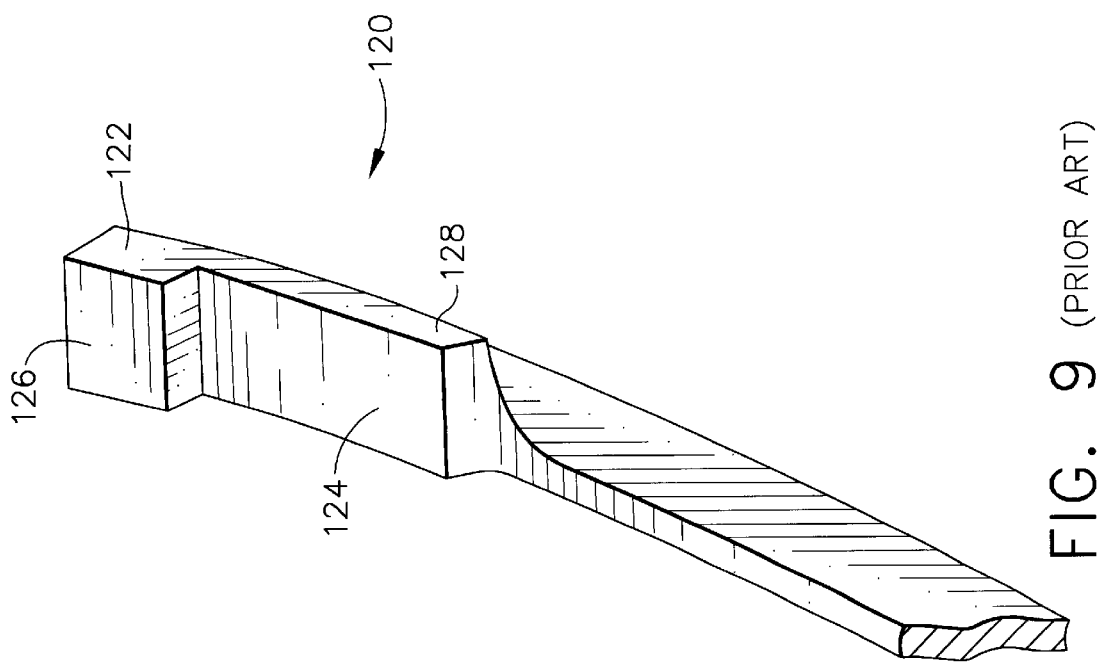
FIG. 9 is a perspective view of a prior art foot portion.

FIGS. 9 shows a prior art foot portion 120 from Arora, U.S. Pat. No. 5,755,445. The foot portion 120 has a step 122 that divides the inner surface 124 into a contacting portion 126 nearest the trailing edge and a depressed portion 128 extending to leading edge. Depressed portion 128 of surface 124 may be tapered outward to form a truncated wedge-shaped gap, or contoured to form a gap of uniform thickness.

Importantly, besides having the groove 110 the foot portion 66 is wider that the prior art foot portion 120.

Figure 9A:
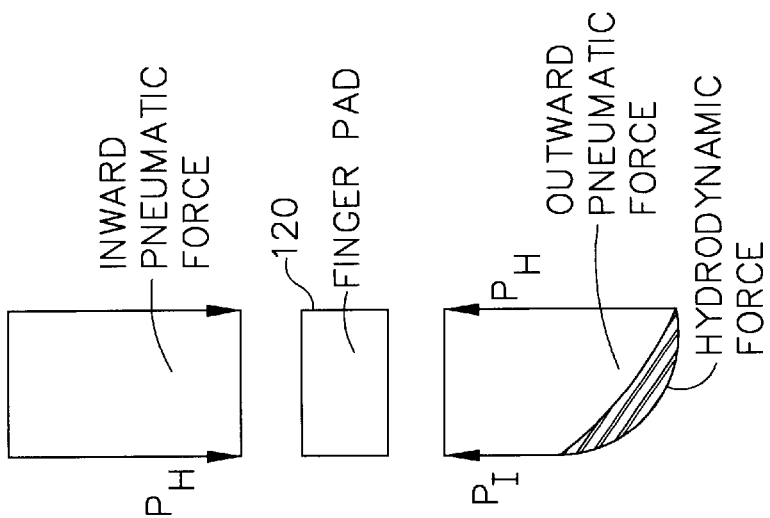
FIG. 9A is a pressure balance diagram of the prior art foot portion of FIG. 9.
Figure 8A:
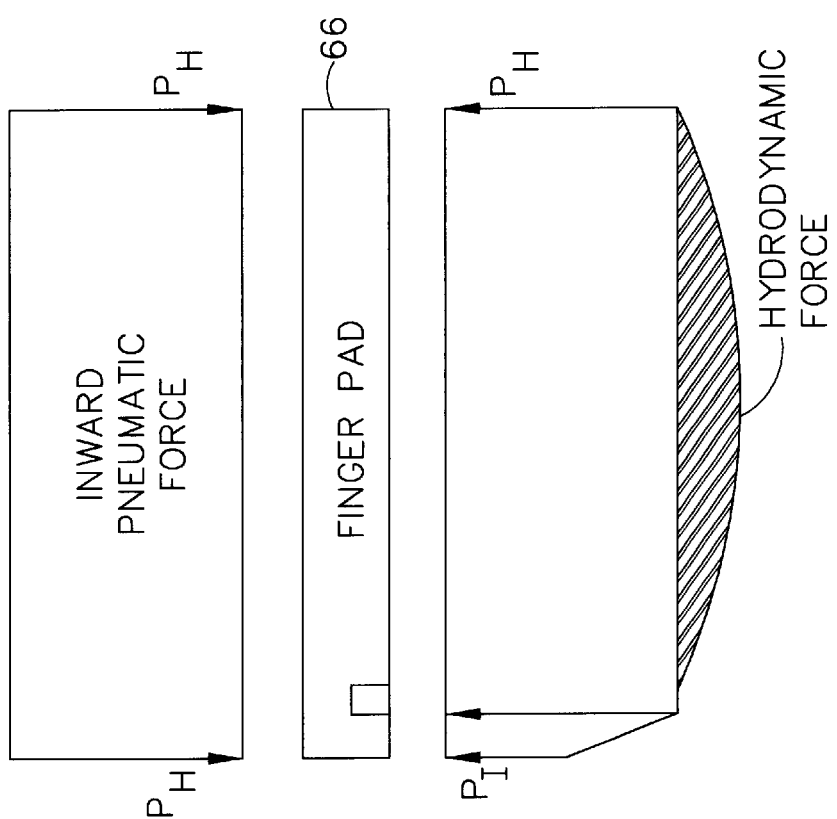
FIG. 8A is a pressure balance diagram of the foot portion of FIG. 8.

Referring back to FIG. 3, the foot portion 66 seals against the surface of the seal rotor 15 which is rotating in the direction indicated by arrow 57. The spiral groove 17 on the rotor 15 generates a hydrodynamic force on the inner surface 108 of the foot portion 66. Groove 110 communicates with high pressure (PH) and the edge 106 is at an intermediate pressure PI. Referring now to FIG. 8A, there is an inward pneumatic or pressure force pushing the foot portion 66 into contact with the surface of the rotor 15. Countering the inward force is the previously mentioned hydrodynamic force and an outward pneumatic force. FIG. 9A shows the pressure balance on the prior art foot portion 120. In comparison to the foot portion 66, with the prior art design a larger area is exposed to pressure differential (PH-PI), reducing the outward pneumatic force and a smaller area is exposed to the hydrodynamic force. Thus, the prior art foot portion has difficulty in generating sufficient outward forces to overcome the inward pneumatic force and as a result does not lift away from the seal rotor surface as the rotational speed increases. With the foot portion 66, however, as the rotational speed increases sufficient outward forces are generated causing the foot portion to lift away from the seal rotor 15. Both diaphragms 24a and 24b have foot portions 66, though for 24b having the foot portion 66 is not as critical because the outer surface of the foot portion is not exposed to the high pressure and therefore the hydrodynamic force is sufficient to cause the foot to lift away as the speed of the shaft increases.

Although the invention has been described in terms of the illustrative embodiment, it will be appreciated by those skilled in the art that various changes and modifications may be made to the illustrative embodiment without departing from the spirit or scope of the invention. It is intended that the scope of the invention not be limited in any way to the illustrative embodiment shown and described but that the invention be limited only by the claims appended hereto.

What is claimed is:

1. An annular sealing apparatus for disposition in cooperation with a body defining a bore and a rotating member rotatably received in the bore, the bore and rotating member bounding a high fluid pressure region and a relatively lower pressure fluid region therebetween, the sealing apparatus inhibiting fluid leakage between the high and lower fluid pressure regions, the sealing apparatus comprising:

a first cover plate disposed in said high fluid pressure region;

a second cover plate disposed in said lower pressure fluid region;

a sealing element disposed between said first and second cover plates and having at least two diaphragm members, said diaphragm members having a circumferentially continuous band portion and a plurality of circumferentially uniformly arrayed finger portions extending radially inward from said band portion to a foot portion at its inner radial end, said foot portion having an inner surface with a groove for sealingly contacting said rotating member;

a first spacer disposed between said first cover plate and said sealing element;

a second spacer disposed between said second cover plate and said sealing element, said second spacer having at least one cavity; and a passageway in fluid communication with said high fluid pressure region and said cavity.

2. The sealing apparatus of claim 1 wherein said foot portion is bounded by a leading edge, a trailing edge, and two axial facing edges and has a generally rectangular shape.

3. The sealing apparatus of claim 2 wherein said groove extends from said leading edge to said trailing edge.

4. The sealing apparatus of claim 3 wherein said groove is disposed closer to one of said axial edges.

5. The sealing apparatus of claim 1 wherein said passageway is comprised of at least one radial passage through said first spacer which is in fluid communication with at least one axial passage through said sealing element which is in fluid communication with at least one radial passage in said second spacer which is in fluid communication with said cavity.

6. The sealing apparatus of claim 1 wherein said first spacer is annular and has a plurality of radial passages extending radially outward from its inner edge.

7. The sealing apparatus of claim 6 wherein said second spacer is annular and has a plurality of circumferentially disposed radial passages.

8. The sealing apparatus of claim 7 wherein said second spacer has a plurality of circumferentially disposed cavities.

9. The sealing apparatus of claim 8 wherein each of said cavities is in fluid communication with at least one of said radial passages of said second spacer.

10. The sealing apparatus of claim 9 wherein said second spacer has an annular dam portion that separates said cavities from said low pressure region.

11. The sealing apparatus of claim 1 wherein said sealing element is comprised of two diaphragm members, each of said having said foot portions with said groove.

12. The sealing apparatus of claim 11 finger portions are spaced apart to define a plurality of uniform gaps therebetween that are narrower than said finger portions.

13. The sealing apparatus of claim 11 wherein said diaphragm members are rotated relative to each other such that said gaps in one of said diaphragm members are blocked by the finger members of the other diaphragm member.

* * * * *

UNITED STATES PATENT AND TRADEMARK OFFICE
CERTIFICATE OF CORRECTION

PATENT NO. : 6,364,316 B1
DATED : April 2, 2002
INVENTOR(S) : Arora

It is certified that error appears in the above-identified patent and that said Letters Patent is hereby corrected as shown below:

Title page,
Item [*] Notice, delete the phrase "by 0 days" and insert -- by 24 days --

Signed and Sealed this

Twenty-eighth Day of September, 2004

JON W. DUDAS
*Director of the United States Patent and Trademark Office*